United States Patent

Selby

[15] 3,664,215

[45] May 23, 1972

[54] MACHINE TOOL WITH BAR STOCK GRIPPER

[72] Inventor: Jack H. Selby, Chagrin Falls, Ohio

[73] Assignee: The Warner & Swasey Company, Cleveland, Ohio

[22] Filed: June 11, 1970

[21] Appl. No.: 45,477

[52] U.S. Cl. .................................... 82/2.5, 82/38, 214/1.1
[51] Int. Cl. ......................................................... B23b 13/02
[58] Field of Search .................. 82/2.5, 2.7, 38; 214/1.1, 1.2, 214/1.3, 1.4

[56] References Cited

UNITED STATES PATENTS

| 477,513 | 6/1892 | Conradson | 214/1.1 |
|---|---|---|---|
| 490,863 | 1/1893 | Conradson | 214/1.1 |
| 3,576,144 | 4/1971 | Strah | 82/2.5 |

Primary Examiner—Leonidas Vlachos
Attorney—Yount and Tarolli

[57] ABSTRACT

An improved machine tool includes a spindle for rotating bar stock which has a noncircular cross sectional configuration. A bar stock feed gripper is engageable with a leading end portion of the bar stock and is movable away from the spindle to pull bar stock to a machining station. Positioning members mounted on the spindle and gripper cooperate to orient clamping surfaces on the gripper in proper alignment with the noncircular bar stock. To orient the gripper clamping surfaces, the positioning member on the gripper is moved into a path of rotation of the positioning member on the spindle as the gripper is moved toward the leading end portion of the bar stock. When the spindle rotates its positioning member into abutting engagement with the positioning member on the gripper, the gripper clamping surfaces are in the desired alignment with the noncircular bar stock.

16 Claims, 6 Drawing Figures

INVENTOR.
JACK H. SELBY
BY
Yount and Tarolli
ATTORNEYS

INVENTOR.
JACK H. SELBY

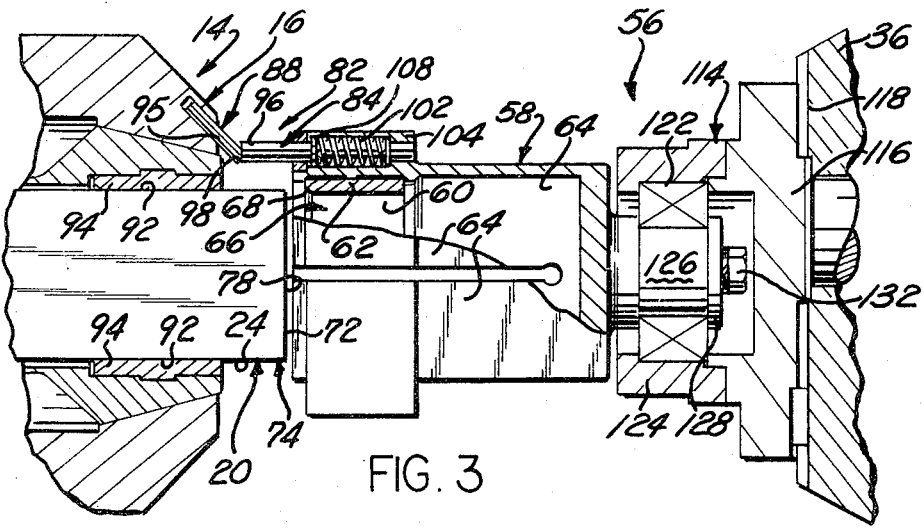
FIG. 3
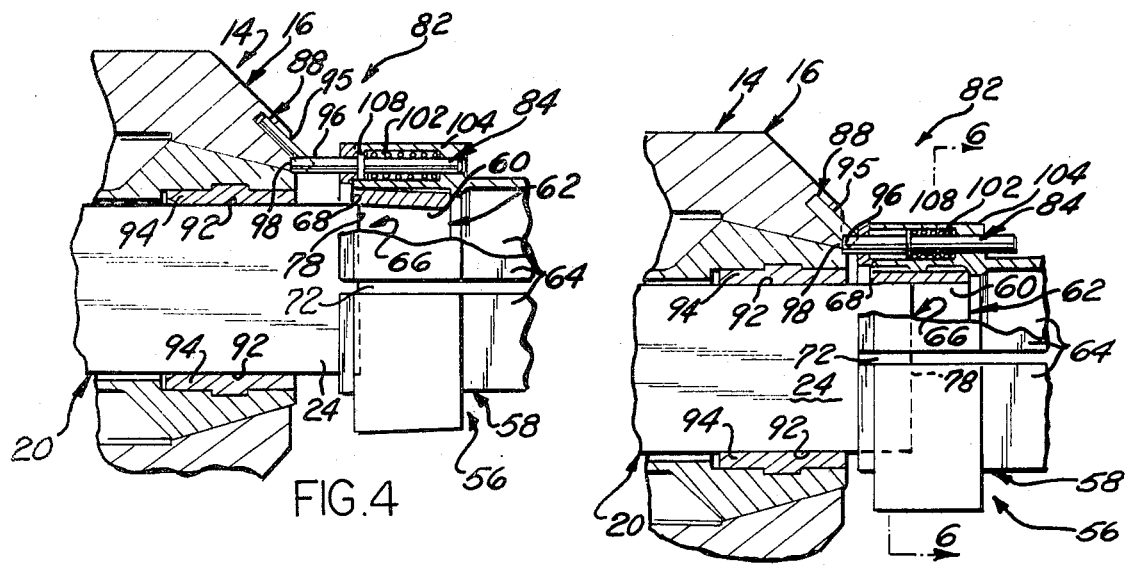
FIG. 4
FIG. 5
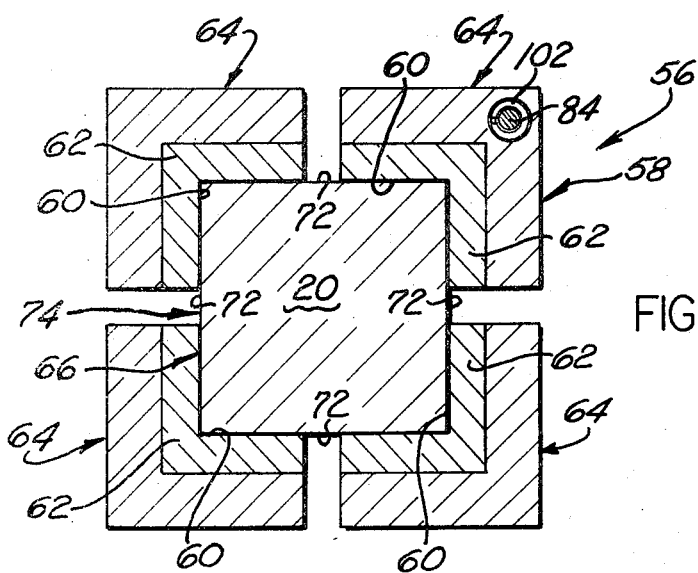
FIG. 6
INVENTOR.
JACK H. SELBY
BY Yount and Tarolli
ATTORNEYS

MACHINE TOOL WITH BAR STOCK GRIPPER

This invention relates to an apparatus for orienting a bar stock feed gripper relative to bar stock having a noncircular cross sectional configuration.

In a machine tool having a spindle assembly, bar stock must be fed from the spindle assembly to a machining station on successive cycles of operation of the machine tool. This may be accomplished by engaging one end of the bar stock with a gripper and moving the gripper away from the spindle assembly. After the desired length of bar stock has been fed to the machining station, the gripper is disengaged from the bar stock. When the gripper is to be moved into engagement with bar stock having a noncircular cross sectional configuration, such as square or hexagonal bar stock, clamping surfaces on the gripper must be properly oriented with respect to the bar stock.

Accordingly, it is an object of this invention to provide a new and improved machine tool having a spindle assembly operable to rotate noncircular bar stock and a means for orienting clamping surfaces of a bar stock feed gripper in a predetermined relationship with the noncircular bar stock as the gripper is moved from a disengaged position to a bar stock gripping position.

Another object of this invention is to provide a new and improved machine for operating on bar stock having a noncircular cross sectional configuration, wherein the machine includes a spindle for rotating the bar stock about its longitudinal axis while it is held by a chuck, a gripper having clamping surfaces for gripping the bar stock, a means for moving the gripper from an inactive or disengaged position in which the gripper is spaced from one end of the bar stock to a gripping position in which the gripper clamping surfaces engage the end of the bar stock and for moving the gripper away from the chuck to pull bar stock into a work area, and wherein a means is provided for orienting the clamping surfaces of the gripper in a predetermined relationship with the end of the bar stock during movement of the gripper from the inactive position toward the gripping position.

Another object of this invention is to provide a new and improved machine as set forth in the next preceeding object and wherein the means for orienting the clamping surfaces of the gripper includes a first positioning member mounted on the spindle in a predetermined relationship with the noncircular bar stock and a second positioning member mounted on the gripper in a predetermined relationship with the gripper clamping surfaces, the positioning members being moved into abutting engagement by rotation of the spindle assembly to thereby orient the clamping surfaces of the gripper in the desired relationship with the noncircular bar stock.

Another object of this invention is to provide a new and improved gripper assembly for use in a machine tool having a movable turret for holding tools to machine bar stock having a noncircular cross sectional configuration as the bar stock is rotated about its longitudinal axis, the gripper assembly includes a plurality of resilient fingers with clamping surfaces formed on outer end portions thereof for engaging an outer surface of the noncircular bar stock as it is rotated by the spindle assembly and an alignment surface located in a predetermined relationship with the clamping surfaces and adapted to engage a positioning surface located on the spindle assembly in a predetermined relationship with the bar stock held by the spindle assembly to thereby orient the clamping surfaces relative to the bar stock.

These and other objects and features of the invention will become more apparent upon a consideration of the following description taken in connection with the accompanying drawings wherein:

FIG. 3 is an enlarged fragmentary sectional view illustrating a bar stock gripper assembly constructed in accordance with the present invention in an oriented relationship with a spindle assembly of the machine tool of FIGS. 1 and 2;

FIG. 4 is a fragmentary sectional view, generally similar to FIG. 3, illustrating the bar stock gripper assembly of FIG. 3 in an initial engaging relationship with an end portion of bar stock;

FIG. 5 is a fragmentary sectional view, generally similar to FIG. 4, illustrating the bar stock gripper assembly in a gripping relationship with the end portion of the bar stock; and FIG. 6 is a cross sectional view, taken generally along the line 6—6 of FIG. 5, further illustrating the relationship between the end portion of the bar stock and the bar stock gripper assembly.

Figure 1:
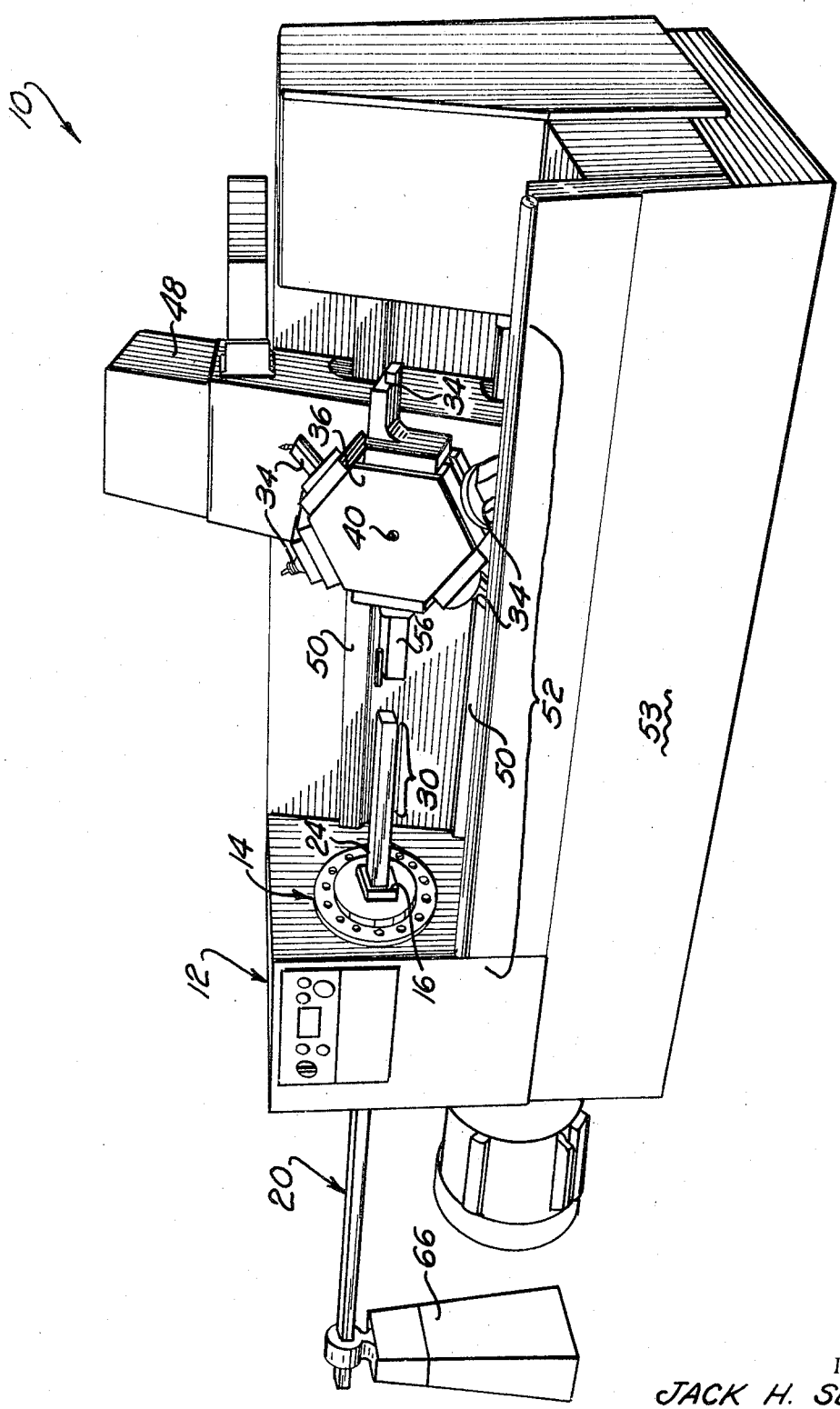
FIG. 1 is an illustration of a machine tool having a bar stock feed apparatus constructed in accordance with the present invention.

A machine tool 10 having a bar stock feeding aparatus constructed in accordance with the present invention is illustrated in FIG. 1. The machine tool 10 is a well known saddle-type turret lathe and includes a headstock 12 in which a spindle assembly 14 is mounted. Although the machine tool 10 is a turret lathe having only a single spindle assembly 14, it is contemplated that a bar feed aparatus constructed in accordance with the present invention could be used in multiple spindle machines and in machines other than turret lathes.

The spindle assembly 14 includes a collet chuck 16 having jaws for gripping bar stock 20 and holding the bar stock against axial movement while the bar stock is being rotated about its longitudinal axis by the spindle assembly 14. An actuator assembly 22 (FIG. 2) operates the jaws of the chuck 16 between a closed condition in which the jaws securely grip the bar stock and an open condition is which the bar stock is released for axial movement relative to the spindle assembly 14. Although it is contemplated that many different types of spindle assemblies could be utilized, in a specific preferred embodiment of the invention the spindle assembly 14 is the same as disclosed in U. S. Pat. No. 2,546, 326 to Wetzel. In order to avoid prolixity of description, the disclosure therein is hereby incorporated into this specification by this reference thereto.

The spindle assembly 14 is operable to rotate the bar stock 20 with a leading end portion 24 of the bar stock extending into a work or machining station 30 (FIG. 1) where it is machined in a known manner by tools 34 mounted on a turret 36. The turret 36 is rotatable about a center pivot 40 to index the various tools 34 to working positions relative to the leading end portion 24 of the bar stock 20. The turret 36 is mounted on a cross slide 42 (FIG. 2) for crosswise movement to position a selected tool 34 transversely relative to the bar stock 20. This transverse movement of the cross slide 42 is guided by ways or tracks 44 extending perpendicular to a longitudinal axis of the bar stock 20 and the spindle assembly 14. The ways 44 are mounted on a saddle or carriage 48 which is moved along bedways or tracks 50 in a work area 52 which extends away from the headstock 12 for substantially the entire length of a base 53 (FIG. 1) of the machine tool 10. By moving the saddle 48 along the bedways 50 which are parallel to the longitudinal axis of the spindle assembly 14, the position of the tools 34 can be adjusted longitudinally relative to the end portion of the bar stock 20 and the base 53 for the machine tool 10.

Figure 2:
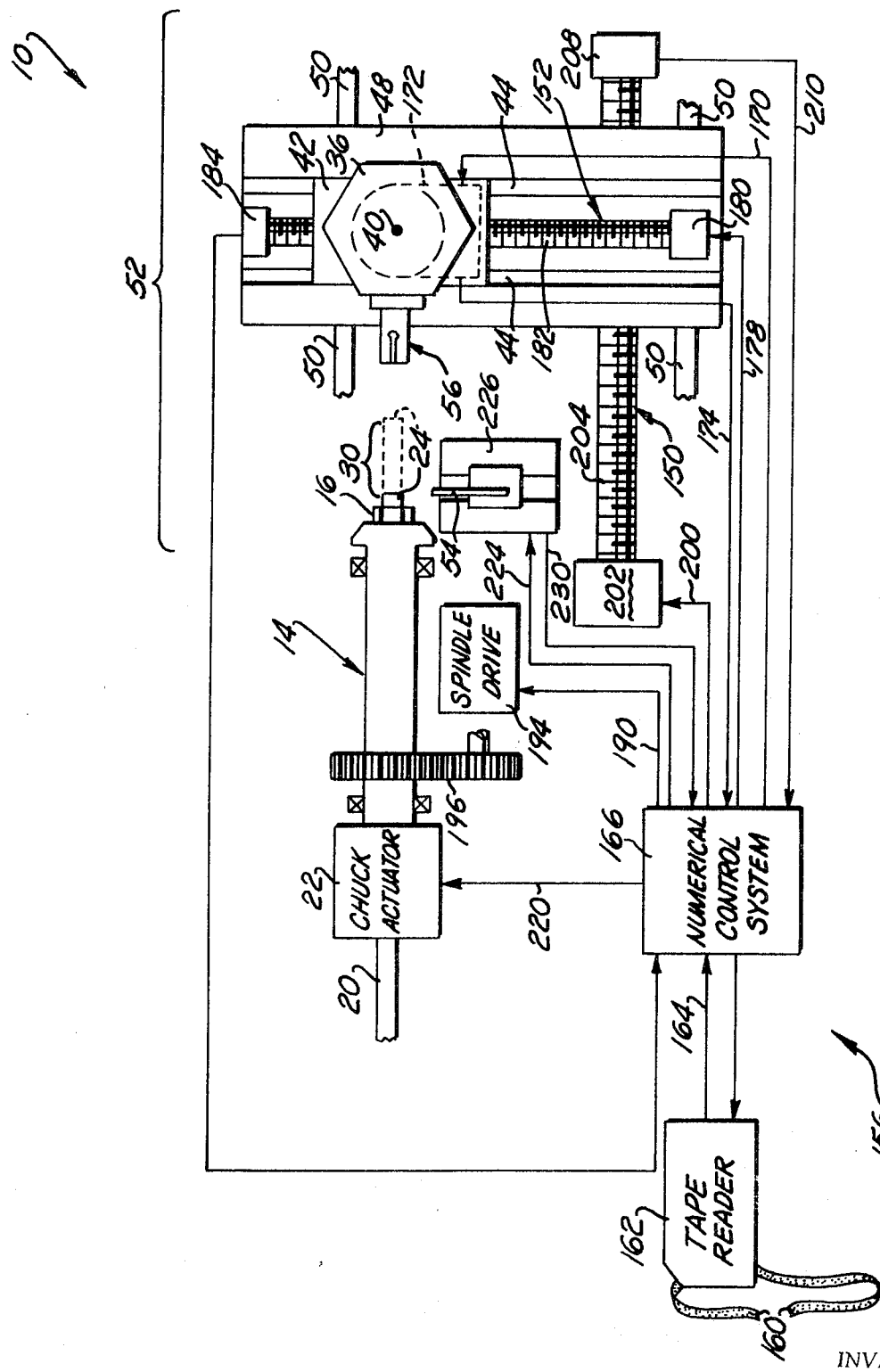
FIG. 2 is a highly schematized illustration of the machine tool of FIG. 1.

At the end of a cycle of operation of the machine tool 10, the leading end portion of the bar stock 20 is severed from the remainder of the bar stock by operation of a cutoff tool 54 (FIG. 2). For purposes of clarity of illustration, the cutoff tool 54 has been omitted from FIG. 1. Operation of the cutoff tool 54 leaves a relatively short portion of the bar stock 20 extending from the chuck 16 into the work area 52, as shown in solid lines in FIG. 2.

When the next piece or part is to be machined from the bar stock 20, the leading end portion 24 of the bar stock must be fed to the work or machining station 30. To accomplish this, the relatively short leading end portion 24 of the bar stock is clampingly engaged by a bar stock gripper assembly 56. The chuck 16 is then opened and a desired length of the bar stock 20 is pulled to the work station 30 by moving the gripper assembly 56 away from the chuck 16, that is toward the right as viewed in FIG. 2. When the desired length of bar stock 20 has been pulled to the work station 30, the pulling movement of the gripper 56 is interrupted and the chuck 16 is operated to the closed condition to hold the bar stock against further axial movement. The gripper assembly 56 is then disengaged from the bar stock by continuing the movement of the gripper assembly in a direction away from the spindle assembly 14. The leading end portion 24 of the bar stock can then be machined by suitable operation of the machine tool 10.

The gripper assembly 56 is moved into gripping engagement with the leading end portion 24 of the bar stock 20 by pressing a gripper 58 (FIG. 3) axially onto the leading end portion of the bar stock in the manner illustrated in FIGS. 4 and 5. When the gripper 58 grips the bar stock 20, clamping or gripping surfaces 60 on plates 62 mounted on resilient finger elements 64 clampingly engage the leading end portion 24 of the bar stock 20 (FIG. 5). To provide for this clamping engagement, the clamping surfaces 60 define an opening 66 having a cross sectional configuration which is similar to and slightly smaller than the cross sectional configuration of the bar stock 20. Therefore, the resilient fingers 64 are cammed slightly outwardly by pressing sloping or beveled end surfaces 68 on the clamp plates 62 against the leading end portion 24 of bar stock 20 as the gripper 58 is moved axially toward the spindle assembly 14. To minimize any possibility of damage to the chuck 16, the axial movement of the gripper 58 relative to the chuck 16 is stopped with the open end portion 66 of the gripper 58 spaced a predetermined distance from a leading side of the chuck.

When bar stock 20 having a noncircular cross sectional configuration is to be machined, the opening 66 defined by the clamping surfaces 60 must have the same noncircular cross sectional configuration as the bar stock to enable the fingers 64 to grip the leading end portion 24 of the bar stock 20. If the gripper 58 is moved from a disengaged position (FIGS. 2 and 3) toward the engaged position of FIG. 5 with the clamping surfaces 60 out of axial alignment with longitudinally extending side surfaces of the noncircular bar stock 20, the ends of the fingers 64 will hit against or interfere with the end of the bar stock. Therefore in order to move the gripper 58 from the disengaged position of FIG. 3 to the engaged position of FIG. 5, the noncircular opening 66 must be aligned with the leading end of the bar stock 20 in such an orientation that the clamping surfaces 60 extend parallel to the longitudinally extending outer surfaces of the noncircular bar stock.

For example, when bar stock 20 having a square cross section is to be machined, the clamping surfaces 60 of the gripper 58 define a square opening 66. The square opening 66 must be oriented with the clamping surfaces 60 extending parallel to flat sides 72 (FIG. 6) defining a longitudinally extending outer surface 74 of the square bar stock 20 before the gripper 58 is pressed against the leading end portion 24 of the bar stock 20. If the clamping surfaces 60 of the gripper 58 are not properly aligned with the sides 72 of the square bar stock 20, the leading or outer ends of the fingers 64 will be moved into interfering engagement with the square end face 78 of the bar stock 20. Of course, this interferance between the fingers 64 and the bar stock 20 would prevent the gripper 58 from being pushed or pressed axially onto the leading end portion 24 of the bar stock.

In accordance with the present invention, a gripper orienting device or assembly 82 is provided to move the clamping surfaces 60 into alignment with the side surfaces 72 of the bar stock 20 as the gripper 58 is moved from a disengaged position (FIG. 1) to an engaged or gripping position (FIG. 5). The gripper orienting assembly 82 includes a gripper positioning member or pin 84 which is mounted on the gripper 58 in a predetermined relationship with the clamping surfaces 60. Similarly, a chuck positioning member or pin 88 is mounted on the chuck 16 in a predetermined relationship with clamping surfaces 92 on jaws 94 of the chuck 16. The chuck clamping surfaces 92 firmly grip the sides 72 of the noncircular bar stock 20. Therefore, the surfaces 92 define a chuck opening having a cross sectional configuration corresponding to the noncircular cross sectional configuration of the bar stock 20, i.e. square. The positioning members 84 and 88 are located in such a relationship relative to the clamping surfaces 60 and 92 that when cylindrical outer surfaces 95 and 96 on the positioning members are in abutting engagement, the clamping surfaces 60 are parallel to and in axial alignment with the sides 72 of the bar stock 20 and the chuck clamping surfaces 92.

The positioning members 84 and 88 are brought into abutting engagement with each other when the gripper assembly 56 is moved toward the spindle assembly 14 by operating the spindle assembly to slowly rotate the chuck 16 and bar stock 20. Rotation of the chuck 16 causes the positioning member 88 to be moved along an annular path which is coaxial with a longitudinal axis of the bar stock 20. The positioning member 84 on the gripper 58 extends outwardly of and preceeds the resilient fingers 64 as the gripper 58 approaches the chuck 16. Therefore, the leading or outer end portion of the positioning member 84 extends into the path of rotational movement of the chuck positioning member 88 before the gripper 58 engages the leading end portion 24 of the bar stock 20 (FIG. 3). Once the gripper positioning member 84 has moved into this path, the gripper positioning member is engaged by the chuck positioning member 88 as it is rotated by the spindle assembly 14.

When the outer surfaces 95 and 96 of the positioning members 84 and 88 are in abutting engagement, the gripper clamping surfaces 60 are aligned with the sides 72 of the bar stock 20 and the chuck clamp surfaces 92. Therefore, further movement of the gripper assembly 56 toward the leading end portion 24 of the bar stock 20 moves the cam surfaces 68 on the clamp plates 62 into abutting engagement with the corners of the bar stock 20 at the leading end face 78 of the bar stock (FIG. 4). Continued movement of the gripper 58 toward the chuck 16 causes the resilient fingers 64 to be spread apart and moved transversely outwardly by a camming action of the surfaces 68 against the leading end of the bar stock 20. This separating of the resilient fingers 64 increases the size of the gripper opening 66 so that it has the same cross sectional dimensions as the bar stock 20. Further axial movement of the gripper 58 toward the chuck 16 causes the gripper clamping surfaces 60 to be slid along the sides 72 of the bar stock 20.

To provide for secure gripping engagement of the gripper 58 with the leading end portion 24 of the bar stock 20, the gripper is moved axially to the position illustrated in FIG. 5 in which the leading end of the gripper is relatively close to the chuck 16. To enable the gripper to be moved this close to the chuck 16, the gripper positioning member 84 must move from an extended position (FIG. 3) in which it leads the gripper 58 by a relatively large distance to a retracted position (FIG. 5) in which the positioning member extends forwardly of the gripper for a relatively short distance. The gripper positioning member 84 is moved axially between the extended and retracted positions after engagement of a leading end surface 98 of the gripper positioning member 84 with the chuck 16 (FIG. 4). Movement of the gripper 58 toward the chuck 16 then causes the gripper positioning number 84 to be pressed inwardly against the influence of a biasing spring 102 which is located in a gripper housing 104. The housing 104 is mounted on one of the resilient fingers 64 and supports the gripper positioning member 84 for sliding movement between the extended and retracted positions. When the gripper 58 is subsequently moved away from the chuck 16, the biasing spring 102 pushes against a stop 108 which is fixedly connected to the gripper positioning member 84 to move the gripper positioning member outwardly to the extended position of FIG. 3.

The gripper 58 is mounted on the turret 36 by a base 114 (FIG. 3) having a dovetail slide 116 which engages a dovetail slot 118 formed in a side surface of the turret 36 to mount the base on the turret in a known manner. The gripper 58 is rotatably supported on the base 114 by a bearing assembly 122 having an outer race which engages an annular side wall 124 of the base 114 and an inner race which is mounted on a cylinderical support section 126 of the gripper 58. The support section 126 is retained against axial movement relative to the base 114 by an end plate 128 which is secured to the support section 126 by a bolt 132. The resilient fingers 64 of the gripper 58 extend axially outwardly from the support section 126. Thus the gripper 58 is supported by the bearing assembly 122 for rotation relative to base 114 and turret 36 under the influence of rotational forces applied to the gripper positioning member 84 by the chuck positioning member 88 and spindle assembly 14. Rotation of the gripper 58 with the chuck 16 maintains the clamp surfaces 60 on the gripper 58 in alignment with the side surfaces 72 of the bar stock 20 as the bar stock is rotated by the spindle assembly 14.

The gripper assembly 56 is advantageously mounted on the turret 36 so that a drive assembly of 150 (FIG. 2) for moving the saddle 48 along the bedways 50 and a drive assembly 152 for moving the cross slide 42 along the ways or tracks 44 can be utilized to accurately position and move both the tools 34 and the gripper assembly 56 relative to the spindle assembly 14. In addition, mounting the gripper assembly 56 on the turret 36 enables common numerical control circuitry 156 to be utilized to control movement of the gripper assembly 56 relative to the spindle assembly 14 and to control movement of the tools 34 during machining of bar stock 20. However, it is contemplated that in certain machines it may be desirable to provide one assembly for moving the gripper 56 and another assembly for moving tools, similar to the tools 34, relative to the bar stock at the machining station 30. It is also contemplated that known manual controls could be utilized if desired.

The numerical control circuitry 156 is operable to effect movement of the turret 36 and gripper assembly 56 to pull a predetermined length of the bar stock 20 to the work station 30 and to effect movement of the tools 34 to operate on this predetermined length of bar stock. The control circuitry 156 operates the machine tool 10 through a plurality of cycles of operation in accordance with a predetermined program which is recorded on a punched tape 160. It is contemplated that the control circuitry 156 can take many different forms, such as that disclosed in application Ser. No. 45,478 filed on June 11, 1970 by Charles T. Blake and entitled Machine Tool (File No. 14,424). It is also contemplated that the control circuitry could be constructed as shown in U. S. Pat. No. 3,431,478 issued to J.W. Forrester et al. or as shown in U.S. Pat. No. 3,190,139 issued to E.S. Swanson.

At the beginning of a cycle of operation of the machine tool 10, the turret 36 is operated to position the gripper assembly 56 in axial alignment with the bar stock 20. To accomplish this, the turret is indexed in accordance with the data read from the tape 160 by a reader 162 and sent over a path 164 to a numerical control system 166. In response to this data, the numerical control system 166 sends control signals over a path 170 to a drive mechanism 172 on the cross slide 42. The drive mechanism 172 then rotates or indexes the turret 36 to the position illustrated in FIG. 2 in which the opening 66 in the gripper 58 faces toward the spindle assembly 14. A feedback signal is sent along a path 174 to the numerical control system 166 upon the completion of this indexing operation.

The reader 162 thereupon reads the tape 160 and transmits command data to the numerical control system 166. This command data indicates the position of the turret 36 on the saddle 48 when a longitudinal axis of the gripper assembly 56 is aligned with the longitudinal axis of the bar stock 20. Upon receipt of this data, the numerical control system 166 sends a control signal over a path 178 to operate a servomotor 180 in the cross slide drive assembly 152. The servomotor 180 is operated in the proper direction to rotate a drive screw 182 and move the cross slide 42 to a position in which the gripper assembly 56 is axially aligned with the spindle assembly 14 (FIG. 2). When a feedback signal from an encoder 184 corresponds to the numerical data stored in the control system 166, operation of the servomotor 180 is interrupted.

Once the gripper assembly 56 has been moved into axial alignment with the bar stock 20 and spindle assembly 14, the tape 160 is stepped and a signal sent to the numerical control system 166 which sends a signal over a path 190 to initiate slow speed operation of a spindle drive mechanism 194. The spindle drive mechanism 194 drives the spindle assembly 14 at a low speed through a gear train 196. This low speed operation of the spindle assembly 14 moves the chuck positioning number 88 along an annular path having its central axis coincident with the longitudinal axes of the bar stock 20 and gripper assembly 56.

The gripper assembly 56 is then moved axially toward the spindle assembly 14 and into engagement with the relatively short leading end portion 24 of the bar stock 20. Accordingly, the reader 162 reads the tape 180 and transmits command data representing a reference number which is determinative of the displacement of the saddle 48 and turret 36 relative to a zero or reference position when the gripper assembly 56 grips the end portion 24 of the bar stock 20. In response to this command data, the numerical control system 166 transmits a control signal over path 200 to a servomotor 202 which rotates a drive screw 204 to move the saddle 48 along the bedways 50 toward the spindle assembly 14.

As the saddle 48 and gripper assembly 56 are moved toward the spindle 14 by this operation of the drive assembly 150, feedback signals are transmitted from an encoder or signal generator 208 over a path 210 to the numerical control system 166. As the gripper assembly 56 approaches the spindle assembly 14, the gripper positioning member 84 is moved into the annular path along which the chuck positioning member 88 is being moved by operation of the spindle assembly 14. Therefore, the chuck positioning member 88 moves into abutting engagement with the gripper positioning member 84 to orient the gripper clamp surfaces 60 in alignment with the sides 72 of the noncircular bar stock 20 and the clamp surfaces 92 of the chuck 16. As the axial movement of the gripper assembly 56 toward the spindle assembly 14 is continued, the chuck positioning member 88 will apply a driving force to the gripper positioning member 84 to rotate the gripper 58 about its longitudinal axis to maintain the axial alignment between the gripper clamp surfaces 60 and the side surfaces 72 of the noncircular bar stock 20.

Continued movement of the gripper assembly 56 toward the spindle assembly 14 moves the cam surfaces 68 on the gripper plates 62 into engagement with the leading end of the bar stock 20 to force the resilient figures 64 transversely outwardly. Immediately thereafter the leading end surface 98 of the gripper positioning member 84 engages the chuck 16 to initiate movement of the gripper positioning member toward the retracted position of FIG. 5. Still further movement of the gripper assembly 56 toward the spindle assembly 14 moves the clamp surfaces 60 along the sides 72 of the noncircular bar stock 20 until the gripper assembly 56 is in the gripping position of FIG. 5 and the clamp surfaces 60 securely grip the side surfaces 72 of the noncircular bar stock 20. When this occurs, a feedback signal from the encoder 208 corresponds to the numerical data stored in the control system 156 and the operation of the servomotor 202 is interrupted.

After the gripper assembly 56 has engaged the leading end 24 of the bar stock 20, the chuck 16 is operated to the open condition and the gripper assembly is moved away from the spindle assembly 14 to pull a predetermined length of the bar stock to the work or machining position 30. Accordingly, the next step on the tape 160 activates the reader 162 to send a command signal to the numerical control system 86 which in-turn transmits signals over path 220 to the chuck actuator 22 to effect operation of the chuck 16 to the open condition. After a time delay sufficient to enable the chuck 16 to open, the tape 160 is again stepped and numerical data determinative of the length of bar stock to be pulled to the machining position 30 is read and transmitted to the numerical control system 86. Upon receipt of this data, the numerical control system 86 again activates the servomotor 202 to operate the drive assembly 150. However, this time the direction of operation of the drive assembly 150 is reversed to move the saddle 48 and turret 36 away from the spindle assembly 14 so that the gripper assembly 56 pulls the leading end portion of the bar stock 20 to the machining position 30. When the predetermined length of bar stock has been pulled to the machining position 30, a feedback signal from the encoder 208 will correspond to the numerical data stored in the numerical control system 166 and operation of the servomotor 202 is interrupted.

Once the desired length of bar stock 20 has been pulled to the machining position 30, the chuck 16 is operated to the closed position to hold the bar stock against further axial movement and the gripper assembly 56 is disengaged from the bar stock by continuing the movement of the gripper assembly away from the closed chuck. Accordingly, a suitable recordation on the tape 160 activates the reader 162 to send a command signal to the numerical control system 166. Upon receipt of this command signal, the numerical control system 166 sends a command signal over the path 220 to the chuck actuator 22 to effect operation of the chuck 16 to the closed condition. After the chuck 16 has been closed, the tape 160 is again stepped and command signals representing numerical data determinative of the position of the saddle 48 when the gripper assembly 56 is spaced from the leading end of the bar stock 20 is transmitted to the numerical control system 166. Upon receipt of this command data, the numerical control system 166 activates the servomotor 202 to continue the movement of the turret 36 in a direction away from the spindle assembly 14. Since the chuck 16 is in the closed condition, the bar stock 20 is held against axial movement and the gripper clamping surfaces 60 slide along the outer surfaces 72 of the bar stock 20 until the gripper assembly 56 is disengaged from the bar stock. When the gripper assembly 56 is spaced the desired distance from the end of the bar stock, a feedback signal from the encoder 208 corresponds to the command or reference data stored in the numerical control system 166 and the servomotor 202 is deenergized.

The spindle drive assembly 194 is then activated to operate the spindle assembly 14 at a relatively high speed. The turret 36 is indexed, in accordance with data on the tape 160, to move any one of the tools 34 to an operating position relative to the leading end portion of the bar stock 20. The saddle and cross slide drive assemblies 150 and 152 are also operated in accordance with the data recorded on the tape 160 to move the tools 34 into engagement with the length of bar stock in the machining position 30. From time to time during operation of the machine tool 10, the turret 36 will be indexed to bring other tools 34 into the working position and the turret will be moved axially and transversly relative to the bar stock 20 to perform the machining operations dictated by the program stored on the tape 160.

Toward the end of the cycle of operation of the machine tool 10, the cutoff tool 54 is moved into engagement with the rotating bar stock 20 to sever the machined piece or part from the main portion of the bar stock. Accordingly, the tape 160 activates the tape reader 162 to transfer a command signal to the numerical control system 166 which in response thereto transmits a signal over a lead 224 to a drive mechanism 226 for the cutoff tool 54. Activation of the drive mechanism 226 moves the cutoff tool 54 into engagement with the bar stock 20 to sever the machined end portion from the bar stock. Upon completion of this cutting or severing, the cutoff tool 54 is retracted in response to a feedback signal transmitted over a path 230 to the numerical control system 166. In response to this feedback signal, the numerical control system 166 again activates the reader 162 to step the tape 160 to begin the next succeeding cycle of operation of the machine tool 10.

From the foregoing remarks it can be seen that the machine tool 10 has a spindle assembly 14 which is operable to rotate noncircular bar stock 20. The spindle assembly 14 includes a chuck 16 having clamping surfaces 92 for holding the bar stock against axial movement relative to the spindle assembly 14. A gripper assembly 56 is operable to grip the bar stock and pull it away from the chuck 16 to feed a predetermined length of the bar stock to the machining position 30. Clamping surfaces 60 of the gripper assembly 56 are positioned relative to the bar stock 20 and chuck clamping surfaces 92 by engagement of a chuck positioning member 88 with a gripper positioning member 84 as the bar stock 20 is slowly rotated by the spindle assembly 14. The positioning members 84 and 88 are located in such a relationship with the clamping surfaces 60 and 92 that when the outer surfaces of the positioning members are in abutting engagement, the gripper clamping surfaces 60 are aligned with the outer sides 72 of the noncircular bar stock 20 and the clamping surfaces 92 of the chuck 16. Therefore, continued axial movement of the gripper assembly 56 toward the end portion of the bar stock 20 enables the gripper 58 to securely grip the bar stock.

Having described a specific preferred embodiment of the invention, the following is claimed:

1. A machine tool capable of operating at a work station on bar stock having a noncircular cross sectional configuration defined by longitudinally extending outer surfaces of the bar stock, said machine tool comprising a spindle assembly for rotating the bar stock about its longitudinal axis, said spindle assembly including chuck means for holding the bar stock during rotation of the bar stock by said spindle assembly, and feed means for feeding bar stock to the work station by moving the bar stock relative to said chuck means, said feed means including gripper means for gripping bar stock held by said chuck means, said gripper means having clamping surfaces for engaging the longitudinally extending outer surfaces of the bar stock, means for moving said clamping surfaces of said gripper means from an inactive position spaced from the bar stock to a gripping position engaging the longitudinally extending outer surfaces of the bar stock, and means for orienting said clamping surfaces of said gripper means in a predetermined position relative to the longitudinally extending outer surfaces of the bar stock during movement of said clamping surfaces from the inactive position toward the gripping position, said gripper means including a plurality of resilient finger elements having cam surfaces at their outer end portion, said clamping surfaces of said gripper means being formed on said finger elements and defining an opening which is slightly smaller than and has the same noncircular cross sectional configuration as the bar stock held by said chuck means, said means for moving said clamping surfaces of said gripper means being operable to effect movement of the finger elements outwardly to increase the size of the opening slightly by pressing said cam surfaces on said finger elements against an end portion of the bar stock and to thereafter move the clamping surfaces on said finger elements into frictional engagement with the longitudinally extending surfaces of the end portion of the bar stock.

2. A machine tool as set forth in claim 1 wherein said means for orienting said clamping surfaces of said gripper means includes first surface means located in a predetermined relationship with the longitudinally extending outer surfaces of the bar stock and second surface means located in a predetermined relationship with said clamping surfaces of said gripper means, said first and second surface means being movable from a spaced apart relationship into abutting engagement during movement of said clamping surfaces toward the gripping position to thereby orient said clamping surfaces in the predetermined position relative to the longitudinally extending outer surfaces of the bar stock.

3. A machine tool as set forth in claim 2 wherein said spindle assembly includes means for rotating said chuck means and the bar stock held thereby during movement of said clamping surfaces of said gripper means toward the gripping position to thereby move said first surface means into abutting engagement with said second surface means.

4. A machine tool as set forth in claim 3 wherein said gripper means further includes means for enabling said second surface means and said clamping surfaces of said gripper means to rotate with said first surface means and said chuck means upon abutting engagement of said first surface means with said second surface means to maintain said clamping surfaces of said gripper means in the predetermined position relative to the longitudinally extending surfaces of the bar stock during rotation of said chuck means and bar stock by said spindle assembly.

5. A machine tool as set forth in claim 2 wherein said second surface means is formed on a member mounted on said gripper means for movement between an extended position in which said member preceeds said clamping surfaces of said gripper means by a first distance as they are moved from the inactive position to the gripping position and a retracted position in which said member preceeds said clamping surfaces of said gripper means by a second distance which is smaller than the first distance to enable said clamping surfaces of said gripper means to engage the bar stock at a location close to said spindle assembly.

6. A machine tool capable of operating at a work station on bar stock having a noncircular cross section al configuration defined by longitudinally extending outer surfaces of the bar stock, said machine tool comprising a spindle assembly for rotating the bar stock about its longitudinal axis, said spindle assembly including chuck means for holding the bar stock during rotation of the bar stock by said spindle assembly, and feed means for feeding bar stock to the work station by moving the bar stock relative to said chuck means, said feed means including gripper means for gripping bar stock held by said chuck means, said gripper means having clamping surfaces for engaging the longitudinally extending outer surfaces of the bar stock, means for moving said clamping surfaces of said gripper means from an inactive position spaced from the bar stock to a gripping position engaging the longitudinally extending outer surfaces of the bar stock, means for orienting said clamping surfaces of said gripper means in a predetermined position relative to the longitudinally extending outer surfaces of the bar stock during movement of said clamping surfaces from the inactive position toward the gripping position, said means for orienting said clamping surfaces of said gripper means includes first surface means located in a predetermined relationship with the longitudinally extending outer surfaces of the bar stock and second surface means located in a predetermined relationship with said clamping surfaces of said gripper means, said first and second surface means being movable from a spaced apart relationship into abutting engagement during movement of said clamping surfaces toward the gripping position to thereby orient said clamping surfaces in the predetermined position relative to the longitudinally extending outer surfaces of the bar stock, said second surface means being formed on a member mounted on said gripper means for movement between an extended position in which said member preceeds said clamping surfaces of said gripper means by a first distance as they are moved from the inactive position to the gripping position and a retracted position in which said member preceeds said clamping surfaces of said gripper means by a second distance which is smaller than the first distance to enable said clamping surfaces of said gripper means to engage the bar stock at a location close to said spindle assembly, and baising means for urging said member to the extended position, said member being movable to the retracted position against the influence of said biasing means by pressing said member against said spindle assembly as said clamping surfaces of said gripper means are moved from the inactive position to the gripping position.

7. A machine as set forth in claim 6 wherein said clamping surfaces of said gripper means define an opening having a noncircular cross sectional configuration corresponding to the noncircular cross sectional configuration of the bar stock, said means for orienting said clamping surfaces of said gripper means being operable to align said opening with said one end portion of the bar stock while the bar stock is being rotated about its longitudinal axis by said spindle assembly.

8. A machine as set forth in claim 6 wherein said gripper means includes means for enabling said clamping surfaces of said gripper means to rotate about a longitudinal axis of said gripper means, said means for orienting said clamping surfaces of said gripper means being operable rotate said clamping surfaces of said gripper means about the longitudinal axis of said gripper means at the same rotational speed at which said spindle assembly is operable to rotate the bar stock about its longitudinal axis to maintain said clamping surfaces of said gripper means in the predetermined relationship with an end portion of the bar stock during rotation of the bar stock by said spindle assembly.

9. A machine as set forth in claim 1 wherein said means for orienting said clamping surfaces of said gripper means includes first surface means located in a predetermined relationship with said chuck means and second surface means located in a predetermined relationship with said clamping surfaces of said gripper means, said first surface means being rotatable along a generally annular path upon rotation of said chuck means and bar stock upon by said spindle assembly, said second surface means being movable from a position spaced for the path of rotation of said first surface means to a position extending into the path of rotation of said first surface means upon movement of said gripper means from the inactive position to the gripping position, said first surface means being movable into abutting engagement with said second surface means upon rotation of the bar stock by said spindle assembly when said second surface means is in the path of rotation of said first surface means in the predetermined relationship with the bar stock.

10. A gripper assembly for use in a machine tool having a movable turret for holding tools to machine bar stock having a noncircular cross sectional configuration as the bar stock is rotated about its longitudinal axis by a spindle assembly, said gripper assembly comprising a base, mounting means on one side of said base for connecting said base to the turret for movement therewith toward and away from the spindle assembly, gripper means for gripping one end portion of the bar stock as the bar stock is being rotated about its longitudinal axis by the spindle assembly, said gripper means including a plurality of resilient fingers connected to and extending outwardly from a rigid support section, clamping surface means on outer end portions of said resilient fingers for engaging an outer surface of the bar stock as it is being rotated by the spindle assembly, said clamping surface means defining an opening having a noncircular cross sectional configuration which corresponds to and is slightly smaller than the noncircular cross sectional configuration of the bar stock, alignment surface means located in a predetermined relationship with said clamping surface means and extending outwardly from outer end portions of said resilient fingers for engaging a positioning surface located on the spindle assembly in a predetermined relationship with the bar stock rotated by the spindle assembly to orient said clamping surface means on said resilient fingers in a predetermined relationship with the bar stock as the bar stock is being rotated by the spindle assembly, cam surface means located adjacent to an outer end portion of said clamping surface means for engaging an end portion of the bar stock to force said resilient fingers transversely outwardly to increase the size of the opening defined by said clamping surface means after engagement of said alignment surface means with the positioning surface as the turret is moved toward the spindle assembly to bring said clamping surface means into gripping engagement with the end portion of the bar stock, and bearing means operatively interconnecting said support section and said base for supporting said gripper means for rotation relative to said base about a longitudinal axis extending generally parallel to said clamping surface means.

11. A gripper assembly as set forth in claim 10 wherein said alignment surface means is located on a member mounted for sliding movement relative said resilient fingers from an extended position in which said member extends outwardly from said resilient fingers for a first relatively large distance and a retracted position in which said member extends outwardly from said resilient fingers for a second distance which is smaller than said first distance, biasing means operatively interconnecting said gripper means and said member for urging said member to the extended position, said member being movable to the extended position against the influence of said biasing means by engagement of an outer end portion of said member with the spindle assembly as said gripper means is moved toward the spindle assembly by the turret.

12. A machine tool for operating at a work station on bar stock having a noncircular cross sectional configuration defined by longitudinally extending outer surfaces of the bar stock, said machine tool comprising a spindle assembly for rotating the bar stock about its longitudinal axis, and feed means for feeding bar stock to the work station by moving the bar stock relative to said spindle assembly, said feed means including a gripper having clamping surfaces defining an opening having a noncircular cross sectional configuration corresponding to the noncircular cross sectional configuration of the bar stock, a first longitudinally extending positioning element mounted on said gripper in a predetermined location relative to said clamping surfaces and extending longitudinally outwardly of said clamping surfaces in a direction toward said spindle assembly, a second longitudinally extending positioning element mounted on said spindle assembly and extending outwardly of said spindle assembly in a direction toward said gripper, said second positioning element being mounted on said spindle assembly with its longitudinal axis extending transversely to a longitudinal axis of said first positioning element, said second positioning element being disposed in a predetermined relationship with the longitudinally extending outer surfaces of the bar stock and rotatable along an annular path at least a portion of which is disposed between said spindle assembly and said gripper, said annular path having its axis of rotation coincident with an axis of rotation of the bar stock upon rotation of the bar stock by said spindle assembly, means for moving first positioning element along a path having its central longitudinal axis extending transversely to the longitudinal axis of said second positioning element and into the annular path of rotation of said second positioning element prior to engagement of said first positioning with said spindle assembly and while said second positioning element is being rotated by operation of said spindle assembly whereby continued rotation of said second positioning element by said spindle assembly moves said second positioning element into abutting engagement with said first positioning element to position said clamping surfaces in a predetermined relationship with the longitudinally extending outer surfaces of the bar stock and for moving said clamping surfaces into gripping engagement with the longitudinally extending outer surfaces of the bar stock after said clamping surfaces have been positioned in the predetermined relationship therewith.

13. A machine as set forth in claim 12 further including bearing means for supporting said clamping surfaces for rotation with said spindle assembly and bar stock under the influence of forces transmitted from said second positioning element to said first positioning when they are in abutting engagement.

14. A machine as set forth in claim 5 further including biasing means for urging said member to the extended position, said member being movable to the retracted position against the influence of said biasing means by pressing said member against said spindle assembly as said clamping surfaces of said gripper means are moved from the inactive position to the gripping position.

15. A machine tool capable of operating at a work station on bar stock having a noncircular cross sectional configuration defined by longitudinally extending outer surfaces of the bar stock, said machine tool comprising a spindle assembly for rotating the bar stock about its longitudinal axis, said spindle assembly including chuck means for holding the bar stock during rotation of the bar stock by said spindle assembly, and feed means for feeding bar stock to the work station by moving the bar stock relative to said chuck means, said feed means including gripper means for gripping bar stock held by said chuck means, said gripper means having clamping surfaces for engaging the longitudinally extending outer surfaces of the bar stock, means for moving said clamping surfaces of said gripper means from an inactive position spaced from the bar stock to a gripping position engaging the longitudinally extending outer surfaces of the bar stock, and means for orienting said clamping surfaces of said gripper means in a predetermined position relative to the longitudinally extending outer surfaces of the bar stock during movement of said clamping surfaces from the inactive position toward the gripping position, said means for orienting said clamping surfaces of said gripper means includes first surface means located in a predetermined relationship with the longitudinally extending outer surfaces of the bar stock and second surface means located in a predetermined relationship with said clamping surfaces of said gripper means, said first and second surface means being movable from a spaced apart relationship into abutting engagement during movement of said clamping surfaces toward the gripping position to thereby orient said clamping surfaces in the predetermined position relative to the longitudinally extending outer surfaces of the bar stock, said second surface means being formed on a member mounted on said gripper means for movement between an extended position in which an outer end portion of said member preceeds said clamping surfaces of said gripper means by a first distance as they are moved from the inactive position to the gripping position and a retracted position in which the outer end portion of said member preceeds said clamping surfaces of said gripper means by a second distance which is smaller than the first distance to enable said clamping surfaces of said gripper means to engage the bar stock at a location close to said spindle assembly.

16. A machine tool as set forth in claim 12 further including means for supporting said first positioning element for axial movement from a first position extending a first distance outwardly from said gripper and a second position extending outwardly from said gripper for a second distance which is smaller than said first distance.

* * * * *